United States Patent [19]

Matsumoto et al.

[11] E Patent Number: Re. 33,025

[45] Reissued Date of Patent: Aug. 15, 1989

[54] METHOD AND APPARATUS FOR DISPLAY OF DISTANCE AND DIRECTION TO DESTINATION

[75] Inventors: Maneaki Matsumoto, Okazaki; Akira Kuno, Oobu; Koji Numata, Toyokawa, all of Japan

[73] Assignee: Nippon Soken, Inc., Nishio, Japan

[21] Appl. No.: 117,053

[22] Filed: Nov. 5, 1987

Related U.S. Patent Documents

Reissue of:

[64] Patent No.: 4,633,519
Issued: May 5, 1987
Appl. No.: 488,707
Filed: Apr. 26, 1983

[30] Foreign Application Priority Data

Apr. 28, 1982 [JP] Japan ..... 57-70201

[51] Int. Cl.[4] ..... G06F 15/50; G09B 29/10

[52] U.S. Cl. ..... 364/444; 340/988; 364/424.01; 364/436

[58] Field of Search ..... 340/988, 870.37; 33/300, 361; 364/424, 426, 436, 444, 450, 460

[56] References Cited

U.S. PATENT DOCUMENTS

| | | | |
|---|---|---|---|
| 3,749,893 | 7/1973 | Hileman | 364/450 X |
| 3,845,289 | 10/1974 | French | 364/436 |
| 4,084,241 | 4/1978 | Tsumura | 364/460 |
| 4,367,453 | 1/1983 | Kuno et al. | 364/424 X |
| 4,393,709 | 7/1983 | Harumatsu et al. | 33/300 |
| 4,402,050 | 8/1983 | Tagami et al. | 364/460 |
| 4,403,291 | 9/1983 | Von Tomkewitsch | 364/444 |
| 4,418,348 | 11/1983 | Tanaka et al. | 340/870.37 |
| 4,429,469 | 2/1984 | Tsushima et al. | 33/361 |
| 4,453,760 | 3/1984 | Kuno et al. | 364/444 |
| 4,796,191 | 1/1989 | Honey et al. | 364/450 |

FOREIGN PATENT DOCUMENTS

| | | |
|---|---|---|
| 55-143406 | 11/1980 | Japan . |
| 56-74798 | 6/1981 | Japan . |

*Primary Examiner*—Felix D. Gruber
*Attorney, Agent, or Firm*—Cushman, Darby & Cushman

[57] ABSTRACT

A method for displaying positional relation between the present running position of an automobile and a destination on the basis of the wheel rotation signals generated by detecting rotation of left and right wheels of the automobile, setting signals selected at a starting position to represent a distance to the destination from the starting position and a direction of the destination from the starting point, and a direction signal indicating a running direction of the automobile.

9 Claims, 5 Drawing Sheets

| S(501) | S(502) | S(503) | 0 | 0 | 1 | 1 |
|---|---|---|---|---|---|---|
| | | S(504) | 0 | 1 | 0 | 1 |
| 0 | 0 | | SW | W | | NW |
| 0 | 1 | | S | | | N |
| 1 | 0 | | | | | |
| 1 | 1 | | SE | E | | NE |

METHOD AND APPARATUS FOR DISPLAY OF DISTANCE AND DIRECTION TO DESTINATION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an automobile running position display method and device which calculates and displays a positional relation between a present running position of an automobile and a destination.

2. Description of the Prior Art

In a conventional device for indicating the running position of an automobile, as disclosed in Japanese Unexamined Patent Publication (Kokai) No. 55-143405, the running direction of the automobile is found by detecting terrestrial magnetism. In another device, as disclosed in U.S. Pat. No. 4,402,050, the running direction of the automobile is found from an angular velocity of a gas-rate type gyroscope in the yaw direction. The former device, however, cannot reliably find the correct running direction due to disturbances in the magnetic field caused by magnetic materials, such as the vehicle itself. The latter device, on the other hand, cannot reliably find the correct running position due to the affect of vibration of the automobile.

SUMMARY OF THE INVENTION

In view of the problems inherent in the above-mentioned conventional devices, the object of the present invention is to provide a method for reliably indicating the correct running position of an automobile without being effected by disturbances in terrestrial magnetism or vibration of the automobile.

Another object of the present invention is to provide an automobile running position display device which is capable of reliably indicating the correct running position of an automobile without being effected by disturbances in terrestrial magnetism or vibration of the automobile.

The invention is based upon the idea of finding the running direction of the automobile by wheel rotation signals from sensors which detect the rotation of the right and left wheels of the vehicle.

According to the present invention, there is provided a method for displaying the running position of an automobile comprising the steps of: generating signals, selected at a starting position, to represent the distance to a destination from the starting position and the direction of the destination from the starting point; generating wheel rotation signals by detecting rotation of left and right wheels of the automobile; generating a signal indicating the running direction of the automobile; calculating a distance between a present running position of the automobile and the starting position and a turning angle of the automobile by using the generated signals; calculating the positional relation between a present running position of the automobile and the destination using the result of the above-mentioned calculation; generating a signal representing the results of the calculation; and displaying the positional relation between the present running position of the automobile and the destination of the basis of the signal representing the results of the calculation.

According to the present invention, there is also provided a method for displaying the running position of an automobile comprising the steps of: deciding, first, whether or not the set signal associated with a setting of destination distance and direction is generated; when the first decision is affirmative, calculating and storing a value X, Y of a vector from a starting position to destination; calculating and storing an automobile running direction using a running direction signal from a means for detecting the running direction; reading-in pulse numbers Nl and Nr of wheel rotational signals from a means for detecting the left and right wheel rotations; obtaining an automobile running distance L by summing the read-in Nl and Nr and multiplying the results of the summation by a predetermined constant; deciding, second, whether or not the obtained automobile running distance L is equal to a predetermined distance; when the second decision is affirmative, obtaining an automobile turning angle $\theta$ by carrying out subtraction between the read-in Nl and Nr and multiplying the results of the subtraction by a predetermined constant; calculating and storing a value x, y of a vector from the starting position to the present running position using the stored calculated automobile running direction $\alpha$ and the obtained automobile turning angle $\theta$; obtaining a value X', Y' of a vector from the present running position to the destination by carrying out $\alpha$ subtraction between the stored calculated value X, Y and the stored calculated value x, y; replacing the value X, Y with the obtained X', Y' and storing the value X', Y'; and calculating the straight distance of the destination from the present running position and the direction of the destination from the present running position using the stored calculated X', Y' and displaying the calculated distance and the direction on a display means as a distance indication signal and a direction indication signal.

According to the present invention, there is further provided a device for displaying the running position of an automobile comprising: means for generating signals representing the distance and the direction of a destination from the starting position; means for detecting the rotation of the right and left wheels and generating wheel rotation signals; means for generating a signal indicating the running direction; means for calculating a distance between a present running position of the automobile and the starting position and a turning angle of the automobile by using the generated signals; means for calculating the positional relation between a present running position and the destination using the signals of the result of the above-mentioned calculation means and generating a signal indicating the results of the calculation; and means for displaying the positional relation between the present running position and the destination on the basis of the generated indication signal.

DESCRIPTION OF THE PREFERRED EMBODIMENTS

Figure 1:
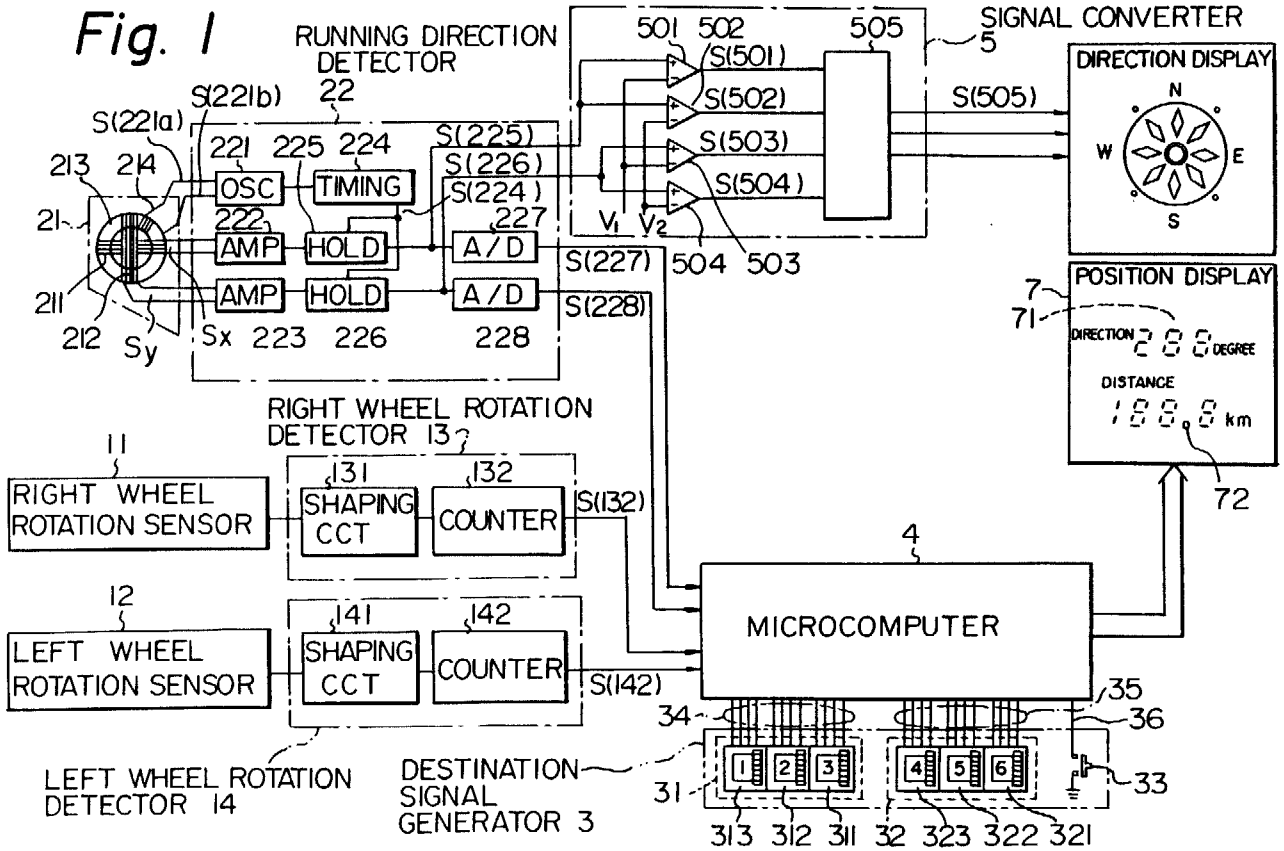
FIG. 1 is a diagram of the construction of an automobile running position display device according to an embodiment of the present invention.

In FIG. 1 is shown the construction of an automobile running position display device according to an embodiment of the present invention. In FIG. 1, reference numeral 11 denotes a sensor which detects the rotation of the axle shaft of the right rear wheel of the automobile. A rotation detector 13 generates right wheel rotation signals S(132). Reference numeral 12 denotes a sensor which detects rotation of the axle shaft of the left rear wheel of the vehicle. A rotation detector 14 generates left wheel rotation signals S(142). Reference numeral 22 denotes a running direction detector which receives signals corresponding to the running direction of the automobile from a running direction sensor 21, which subjects the received signals to analog-to-digital conversion to generate running direction signals S(227) and S(228), and which generates analog direction signals S(225) and S(226) corresponding to the running direction. Reference numeral 3 denotes a destination signal generator which generates destination distance signals through terminals 35 and destination direction signals through terminals 34 for the distance and direction of the destination set at the starting point.

Figure 3:
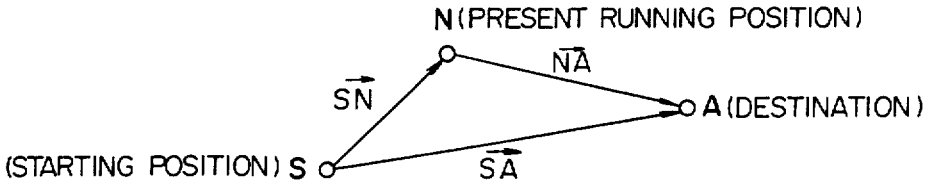
FIG. 3 is a vector diagram of the operation of the device of FIG. 1.

Reference numeral 4 denotes a calculation unit which introduces the right and left wheel rotation signals, running direction signals, destination distance signals, and destination direction signals. The unit continually calculates the vector S→N at the present point N which is separated from the starting point S as shown in the vector diagram of FIG. 3. It performs the calculation (S→A)-(S→N), i.e. subtracts the vector S→N from the vector S→A of the destination A from the starting point S of FIG. 3 set by the destination distance signal and destination direction signal produced by the destination signal generator 3. Namely, the calculation unit 4 calculates the vector N→A from the present point N to the destination A and produces position signals which represent the direction and distance components of the vector N→A.

Reference numeral 5 denotes a signal converter which converts analog direction signals from the running direction detector 22 and which generates signals to display the present running direction. Reference numeral 6 denotes a direction display unit which serves as a first display unit and which selectively displays one direction among eight by emitting light responsive to direction display signals from the signal converter 5. Reference numeral 7 denotes a position display unit which serves as a second display unit, and which digitally displays a destination direction 71 and a destination distance 72 response to position signals from the calculation unit 4.

The right and left rear wheel rotation sensors 11 and 12 are constructed as disclosed in Japanese Unexamined Patent Publication (Kokai) No. 55-87955 which corresponds to U.S. Pat. No. 4,418,348 and produce 36 pulses for each rotation of the right and left rear wheels. The rotation detector 13 consists of a waveform shaping circuit 131 and a rotational frequency counter 132 and produces, through its output terminal, right wheel rotation signals S(132) responsive to signals from the wheel rotation sensor 11. Similarly, the rotation detector 14 consists of a waveform shaping circuit 141 and a rotational frequency counter 142 and produces, through its output terminal, left wheel rotation signals S(142) responsive to signals from the wheel rotation sensor 12.

Figure 4:
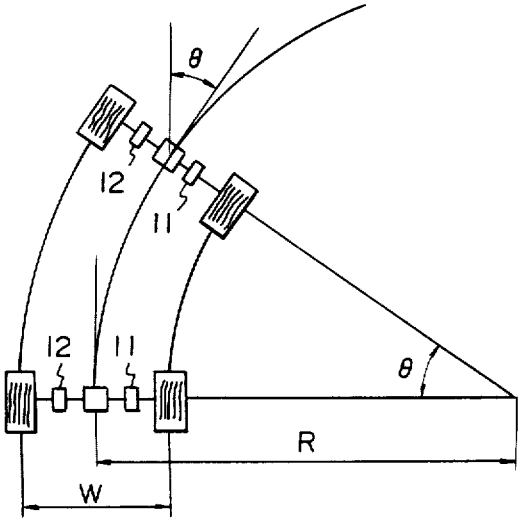
FIG. 4 is a diagram of the operation of the sensors for sensing rotation of the right and left rear wheels in the device of FIG. 1.

Below a description is given, with reference to FIG. 4, of the change in the running direction and distance of an automobile according to the right and left wheel rotation signals.

If the radius of turning of an automobile is denoted by R, the rear tread of the automobile by W, and the turning angle of the automobile by $\theta$[radian], then the running distance $D_r$ of the right rear wheel tire, the running distance $D_l$ of the left rear wheel tire, and the running distance L of the automobile are given by the following equations (1), (2), and (3):

$$D_r = \left(R - \frac{W}{2}\right) \cdot \theta \tag{1}$$

$$D_l = \left(R + \frac{W}{2}\right) \cdot \theta \tag{2}$$

$$L = R \cdot \theta = \frac{D_r + D_l}{2} \tag{3}$$

From equations (1) and (2), the following equation (4) is obtained $$\theta = (D_l - D_r)/W \tag{4}$$

Here, the rear tread W remains constant. When the tire has a size 185/70 HR 14 (dynamic load radius of the tire is 301 mm as specified under Japan Industrial Standard (JIS)), the wheel advances by 1.89 meters per each turn of the axle shaft. The wheel rotation sensors 11 and 12 produce 36 pulses per each turn of the axle shaft. Therefore, the running distance of the wheel per unit pulse is about 5.25 cm/pulse. If the number of pulses of the right wheel rotation signal is denoted by $N_r$ when the right rear wheel tire has run the distance $D_r$, the number of pulses of the left wheel rotation signal is denoted by $N_l$ when the left rear wheel tire has run the distance $D_l$, and the rear tread of the vehicle is 1.4 meters, the following equations (5) and (6) hold true:

$$D_r = N_r \times 5.25 \text{ [cm]} \tag{5}$$

$$D_l = N_l \times 5.25 \text{ [cm]} \tag{6}$$

If equations (5) and (6) are substituted for the equations (3) and (4) the following equations (7), (8), and (9) are obtained:

$$L = (N_r + N_l) \times \frac{5.25}{2} \approx (N_r + N_l) \times 2.63 \text{ [cm]} \tag{7}$$

$$\theta = (N_l - N_r) \times \frac{5.25}{140} \approx (N_l - N_r) \times 0.0375 \text{ [radian]} \tag{8}$$

$$\theta \approx (N_l - N_r) \times 2.15 \text{ [degrees]} \tag{9}$$

In the equation (7), a constant $C_1$ is given as 2.63, and in the equations (8) and (9), a constant $C_2$ is given as either 0.0375 (in radian expression) or 2.15 (in degree expression).

Since the radius of the tire and rear tread remain constant, the turning angle $\theta$ can be found from the right and left wheel rotation signals based upon the running distance L and reference running direction irrespective of the radius R of turning.

Figure 5:
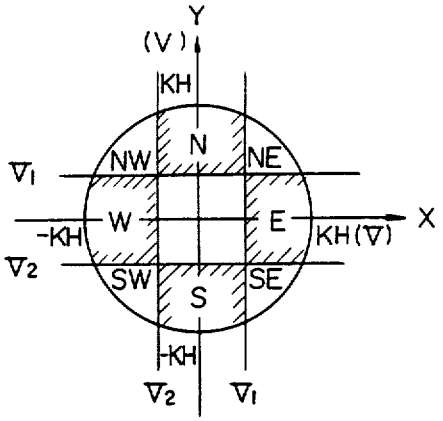
FIGS. 5 and 6 are diagrams of the operation of a running direction detecting portion in the device of FIG. 1.
Figure 6:
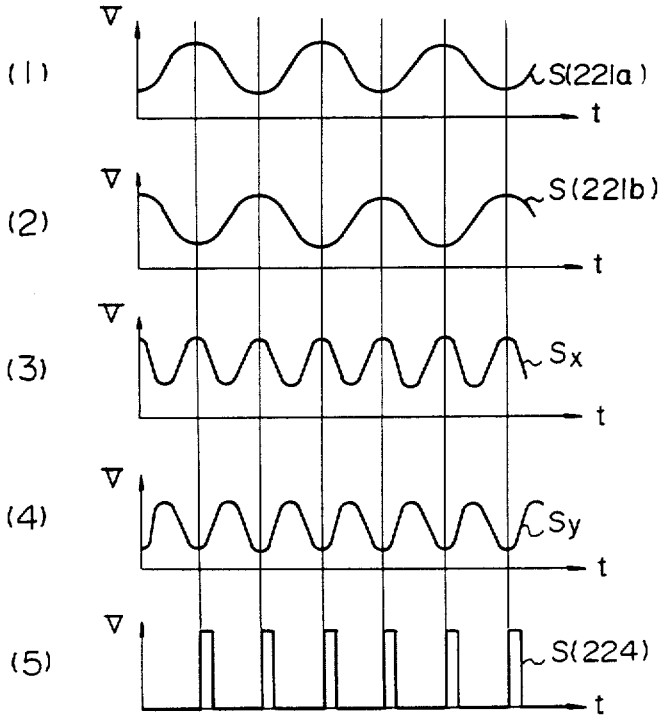

Below is mentioned the operation of the running direction sensor 21 and the running direction detector 22 in conjunction with FIGS. 5 and 6. In FIG. 1, the running direction sensor 21 consists of a ferromagnetic core 213 on which are wound an exciting coil 214 and output coils 211 and 212 at right angles with each other. Reference numeral 221 denotes an oscillation circuit which produces symmetrical a-c signals S(221a) and S(221b) (FIGS. 6(1), 6(2)) to excite the exciting coil 214 at a frequency f. The magnetic field in the magnetic core 213 changes depending upon the intensity H of horizontal component of terrestrial magnetism. Outputs Sx and Sy (FIGS. 6(3), 6(4)), proportional to the changes, are taken out from the output coils 211 and 212. Outputs Sx and Sy of the output coils 211, 212 change depending upon the direction of the running direction sensor 21, i.e., depending upon the running direction of the automobile. The outputs Sx and Sy are so amplified through amplifier circuits 222 and 223 that their maximum values become equal. They are sampled and held by holding circuits 225 and 226 responsive to signals S(224) (FIG. 6(5)) from a timing circuit 224.

Output voltages S(225) and S(226) then change in proportion to the outputs Sx and Sy of the running direction sensor 21. When the running direction sensor 21 is turned by 360°, the locus of the output voltages S(225) and S(226) is represented by a circle of a size proportional to the intensity H of the horizontal component of terrestrial magnetism, as shown in FIG. 5. The radius of the circle represents KH (volts), where K is a constant. The analog direction signals S(225) and S(226) are generated through the output terminals, input to A-D converters 227 and 228 of eight bits, converted into binary signals consisting of eight bits, and are generated as running direction signals S(227) S(228) through the output terminals.

The operation of the signal converter 5 is described below with reference to FIG. 5. In the case when the circle is divided into eight directions, one direction covers an angle of 45°. Therefore, predetermined comparative voltages $V_1$ and $V_2$ are given by.

$$V_1 = K \sin 22.5° \approx 0.3827\ K\ \text{[volts]}$$

$$V_2 = -K \sin 22.5° \approx -0.3827\ K\ \text{[volts]}$$

Figures 7, 8:
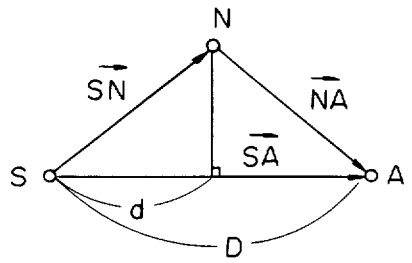
FIG. 7 is a diagram of relations between comparator outputs and running directions of an automobile in a signal converter portion in the device of FIG. 1.
FIG. 8 is a vector diagram of the operation according to another embodiment of the present invention.

The analog direction signals obtained from the running direction detector 22 are divided into three signal levels. Comparators 501 to 504 may be, for example, MC 3302P manufactured by Motorola Co. The comparators 501 and 502 compare the output of holding circuit 225 of the running direction detector 22 with comparative voltages $V_1$ and $V_2$. The comparators 503 and 504 compare the output of holding circuit 226 of the running direction detector 22 with comparative voltages $V_1$ and $V_2$. The relationship between outputs S(501), S(502), S(503), and S(504) of the comparators and running directions of the automobile are represented, as shown in FIG. 7.

For example, when the outputs S(501) and S(502) assume the level 1, the output S(503) assumes the level 0, and the output S(504) assumes the level 1, the automobile is running toward E (east). The logic of outputs of the comparators 501, 502, 503, and 504 is determined by a logic circuit 505, the running direction of the automobile is divided into eight sectors, and a direction signal S(505) represented by binary codes is generated as the output terminals of the signal converter 5.

The destination signal generator 3 consists of a direction setting unit 31, a distance setting unit 32, and a set switch 33. Manually operated, the direction setting unit 31 and the distance setting unit 32 produce, at the terminals 34 and 35, destination direction signals and destination distance signals consisting of binary-coded decimal (BCD) codes to indicate the angle of direction and the distance from the starting point to the destination. In this embodiment, the setting units 31 and 32 have rotary-type digital switches 311, 312, and 313 and 321, 322, and 333, respectively, so that values of three digits can be set. The set switch 33 is operated at a moment when the values are set at the starting point and produces a set signal at a terminal 36.

Figure 2:
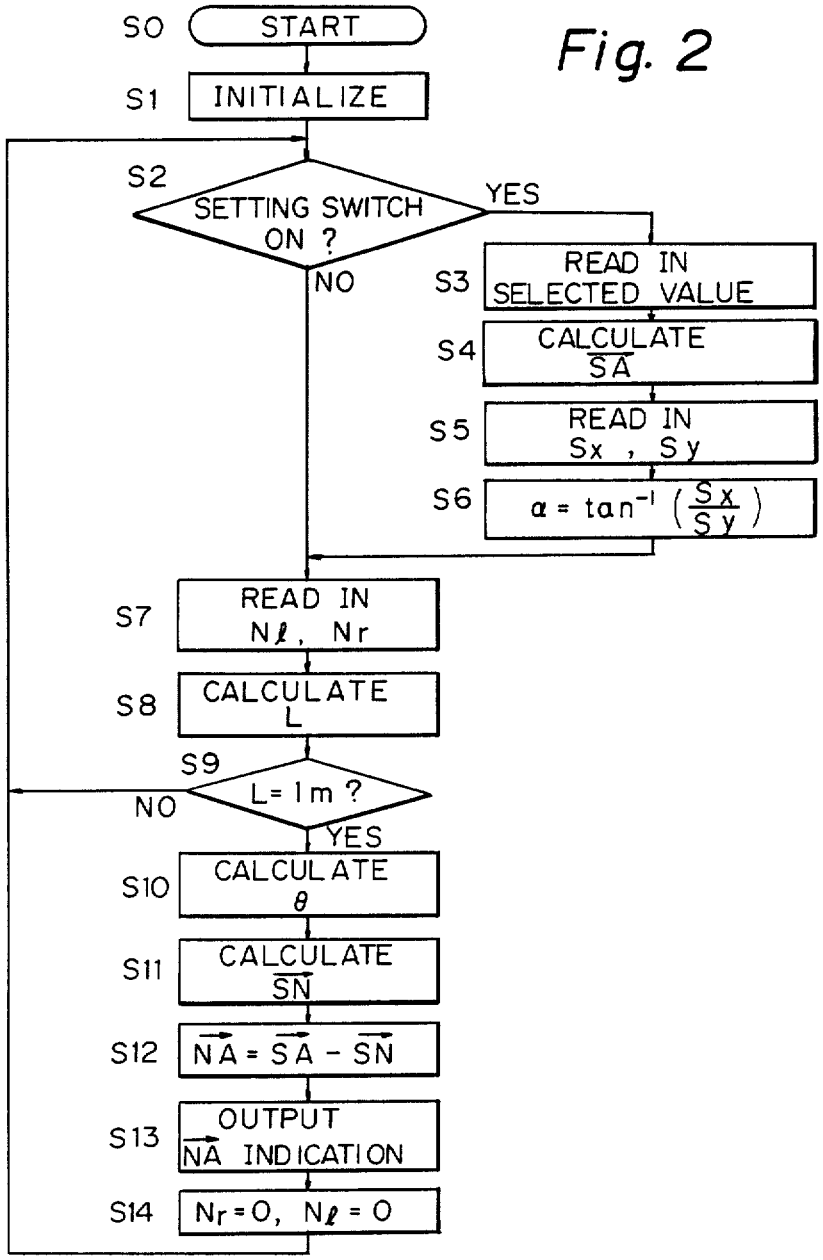
FIG. 2 is a flow chart of an example of operation processing in the device of FIG. 1.

The calculation unit 4 executes the operation shown in FIG. 2 using calculation equipment, e.g., a microcomputer. The operation is started at step S0 when the power supply switch of the running position display is closed. Initial values of various variables are set to zero in step S1. Then, when a set signal is generated from the destination setting unit 3, the vector S→A (FIG. 3) from the starting point S to the destination is calculated and stored divided into components in the X-axial and Y-axial directions, as expressed below:

$$\left.\begin{aligned} X &= L(in) \cdot \sin \theta(in) \\ Y &= L(in) \cdot \cos \theta(in) \end{aligned}\right\} \tag{10}$$

wherein L(in) denotes a distance setpoint value, and $\theta$ (in) denotes a direction setpoint value.

Based on the running direction signals from the running direction detector 22, running direction $\alpha$ of the automobile is calculated and stored as follows when the set signal is generated.

$$\alpha = \tan^{-1}\left(\frac{S_x}{S_y}\right) \tag{11}$$

where $S_x$ denotes an output value of the running direction sensor 21 in the X-axial direction, and $S_y$ denotes an output value in the Y-axial direction.

When the set signal is not generated, step S7 reads numbers $N_r$ and $N_l$ of wheel rotation signals produced by the right and left wheel rotation detectors 11 and 12. Step S8 finds a running distance L which the automobile has run by equation (7). The calculation is repeated until the running distance L reaches 1 meter. When the running distance L has reached 1 meter, the program proceeds to step S10 where the turning angle $\theta$ of the automobile is found by equation (9). Then, step S11 obtains and stores the vector S→F from the starting point S to the present point N by calculating x and y unit components of the running distance as expressed below:

$$\left.\begin{aligned} x &= 1 \times \sin(\theta + \alpha) \\ y &= 1 \times \cos(\theta + \alpha) \end{aligned}\right\} \quad (12)$$

where $\alpha$ represents the running direction of the automobile at the moment when the set signal is generated.

Step S12 obtains the vector N→A from the present point N to the destination A by the calculation of the following equation (13):

$$\left.\begin{aligned} X' &= X - x \\ Y' &= Y - y \end{aligned}\right\} \quad (13)$$

Here, X is replaced by the calculated result X' of equation (13), Y is replaced by the calculated result Y', and a distance L(na) and a direction $\theta$ (na) from the present point N to the destination A are calculated as follows and are set to the display unit 7 as a distance display signal and an angle display signal:

$$L(na) = \sqrt{X^2 + Y^2} \quad (14)$$

$$\theta(na) = \tan^{-1}\left(\frac{X}{Y}\right)$$

When the display of vector N→A is finished, step S14 sets the numbers $N_r$ and $N_l$ of wheel rotation signals to zero. Calculation is performed for every meter of running distance of the automobile as mentioned in detail in the foregoing. Namely, distance L(na) and direction $\theta$(na) from the present point N to the destination A are found and are sent as display signals. The angle display unit 71 and the distance display unit 72 digitally display the direction and distance to the destination. Further, the analog direction signals from the running direction detector 22 are converted through the signal converter 5 and are sent to the running direction display unit 6 so that the display element is selectively illuminated. The running direction display unit 6 may be installed adjacent to the position display unit 7. The running direction display unit 6 comprises eight arrow indications that are radially arrayed. One arrow indication is illuminated to indicate the running direction of the automobile.

In addition to the above-mentioned embodiment, various modifications and alterations of the embodiment are possible within the scope of the present invention. In the above-mentioned embodiment, for instance, 36 pulses are produced by each of the right and left wheel rotation sensors 11 and 12 per each turn. However, the pulses may be produced in further increased numbers to increase the precision so that more precise results calculated by the calculation unit 4 are displayed on the angle display unit 71 and on the distance display unit 72. Not limited to the above embodiment, furthermore, the wheel rotation sensors may be made up of variable resistors, which make it possible to detect the rotation of wheels as the variable.

In the above-mentioned embodiment, furthermore, the running direction detector 22 divides the running direction of the automobile into binary signals consisting of 8 bits in both the X- and Y-axial directions. The binary signals may also be composed of more bits, so that the running direction $\alpha$ of the automobile can be set more accurately and so that the calculation unit 4 produces results of enhanced precision.

In the above-mentioned embodiment, the signal converter 5 divides the circle into eight segments. The circle, however, may be divided into 16 segments, 32 segments, etc., and the display of the direction display unit 5 may accordingly be divided into 16 segments, 32 segments, etc. Moreover, the set switch 33 only may be used instead of the destination signal generator 3 to display the vector S→N on the position display unit to indicate the direction and distance from the starting point S to the present point N, thereby eliminating a cumbersome operation for setting the destination.

Moreover, instead of setting angles by numerals in the direction setting, unit 31 in the destination signal generator 3, a symbol such as northeast, south-southwest, or the like may be set, and the symbol may be input to the calculation unit 4 in the form of codes.

As shown in the vector diagram of FIG. 8, furthermore, the calculation unit 4 may calculate $d/D \times 100$ (%), where D denotes a distance from the starting point S to the destination A, and d denotes value obtained by converting the distance from the starting point S to the present point N into the direction from the starting point S to the destination A, in order to display the position of value d relative to the distance D on the distance display unit 72. In this case, the display can be made in the form of a bar graph or a circular graph instead of the numerical display.

In the above-mentioned embodiment, furthermore, the vector N→A from the present point N to the destination A is calculated by the calculation unit 4 for every meter of running distance for resultant display signals. However, it is also allowable to use a timer to calculate the vector N→A after every predetermined period of time in order to generate display signals.

The angle display unit 71 in the position display unit 7 may be composed of eight light-emitting elements arrayed around the distance display unit 72 so that the direction can be easily comprehended.

Further, running direction $\alpha$ of the vehicle may be found at all times by the calculation unit 4 based upon the signals from the running direction detector 22. In this case, while the running direction $\alpha$ of the vehicle does not change, i.e., while the vehicle is running straight, the difference should be found between the number $N_r$ of right wheel rotation signals and the number $N_l$ of left wheel rotation signals that stem from differences in the air pressure in the tires, so as to correct the difference between the right wheel rotation signals and the left wheel rotation signals.

Moreover, in describing a running locus of the automobile on the position display unit 7 using a cathode ray tube (CRT), the starting point S may be adjusted relative to a map placed on the CRT, and the locus is brought into correct position on the map after the automobile has run for a while, instead of finding the running direction $\alpha$ of the automobile from signals of the running direction detector 22.

What is claimed is:

1. A method for displaying a running position of an automobile comprising the steps of:

calculating and storing coordinate components of a vector value from a starting position to a destination at a starting position, said coordinate components defining a stored distance signal *and a stored absolute direction signal* at said starting position;

generating and storing a signal, at the starting position, [representing an absolute direction of the destination with respect to] *to represent a running direction of the automobile at* the starting position by detecting terrestrial magnetism;

generating, during running, wheel rotation signals by detecting rotation of left and right wheels of the automobile;

calculating, during running, a running distance by using said generated wheel rotation signals;

calculating, during running, a turning angle by using said generated wheel rotation signals;

calculating, during running, a distance to the destination from the present running position *and an absolute direction of the destination with respect to the present running position* by using said stored distance signal *and said absolute direction signal* at the starting position, [and] said calculated distance [during running], *said calculated turning angle, and said running direction of the automobile at the starting position;*

[calculating, during running, an absolute direction of the destination with respect to the present running position by using said stored absolute direction signal at the starting position and said calculated turning angle during running;] and displaying the positional relationship between the present running position of the automobile and the destination on the basis of the result of said calculations.

2. A method for displaying a running position of an automobile comprising the steps of:

deciding, first, whether or not a set signal associated with a setting of destination distance and direction is generated;

when said set signal is generated, calculating and storing values X, Y of a vector from a starting position to *a* destination;

calculating and storing an automobile running direction $\alpha$ using a running direction signal from means for detecting a running direction by terrestrial magnetism; reading-in pulse number $N_l$ and $N_r$ of wheel rotational signals from means for detecting left and right wheel rotations;

obtaining an automobile running distance L by summing the read-in $N_l$ and $N_r$ and multiplying the results of the summation by a predetermined constant;

deciding, second, whether or not the obtained automobile running distance L is equal to a predetermined distance;

when the running distance L is equal to a predetermined distance, obtaining an automobile turning angle [$\alpha$] $\theta$ by carrying out subtraction between the read-in $N_l$ and $N_r$ and multiplying the results of the [subttaction] *subtraction* by a predetermined constant;

calculating and storing values x, y of a vector from the starting position to the present running position using said predetermined distance, the stored calculated automobile running direction $\alpha$ and the obtained automobile turning angle $\theta$;

obtaining values X', Y' of a vector from the present running position to the destination by carrying out subtraction between the stored calculated value X, Y and the stored calculated value X', Y'] *X, Y*; replacing the values X, Y with the obtained values X', Y' and storing the values X', Y'; and calculating a straight distance of the destination from the present running position and the direction of the destination from the present running position using the stored calculated values X', Y' and displaying the calculated distance and the direction on a display means as a distance indication signal and a direction indication signal.

3. A method as defined in claim 2, wherein the distance (L) between the present running position of the automobile and the starting position and the turning angle ($\theta$) of the automobile are calculated by the equations:

$$L \approx C_1(N_r + N_l)$$

$$\theta \approx C_2(N_l - N_r)$$

where $N_r$ and $N_l$ are the numbers of the right and left wheel rotation signals, and $C_1$ and $C_2$ are predetermined constants.

4. A method as define in claim 2, wherein said components x, y in the X-axial and Y-axial directions are calculated by the equation:

$$x = 1 \times \sin(\theta + \alpha)$$

$$y = 1 \times \cos(\theta + \alpha)$$

where $\alpha$ is the running directing of the automobile at the moment when a set signal is generated;

said components X', Y' in the X-axial and Y-axial directions are calculated by the equation:

$$X' = X - x$$

$$Y' = Y - y$$

where X and Y are the components in the X-axial and Y-axial direction of the vector from the staring point to the destination, and a distance L(na) and a direction $\theta$(na) from the present point to the destination are calculated by the equation:

$$L(na) = \sqrt{X^2 + Y^2}$$

$$\theta(na) = \tan^{-1}\left(\frac{X}{Y}\right).$$

5. A device for displaying a running position of an automobile comprising:

means for calculating coordinate components of a vector value from a starting position to a destination at a starting position;

means for generating a signal, at the starting position, to represent [an absolute direction of the destination with respect to the starting position ] *a running direction of the automobile* by detecting terrestrial magnetism;

means for generating, during running, wheel rotation signals by detecting rotation of left and right wheels of the automobile;

control means for calculating, during running, a running distance by using said generated wheel rotation signals, for calculating, during running, a turning angle by using said generated wheel rotation signals, for calculating, during running, a distance to the destination from the present running position *and an absolute direction of the destination with respect to the present running position* by using said calculated coordinate components of a vector value from a starting position to a destination [and], said calculated [distance during] running [; and for calculating, during running, an absolute direction of the destination with respect to the present running position by using said absolute direction signal and] *distance,* said [calculated] turning angle [during running] *and said running direction of the automobile at the starting position*; and means for displaying the positional relationship between the present running position of the automobile and the destination on the basis of the result of said calculations.

6. A device as defined in claim 5, wherein left and right rotation detection sensors for detecting the rotation of axle shafts of left and right rear wheels of the automobile are provided as the means for detecting rotation of left and right wheels and generating wheel rotation signals.

7. A device as defined in claim 6, wherein counters are provided in the means for detecting rotation of left and right wheels and generating wheel rotation signals, said counters receiving and processing the signals from the left and right rotation detection sensors.

8. A device as defined in claim 5, wherein a rotary digital switch is included in the means for generating signals representing a distance and direction of a destination from a starting position.

*9. A device for obtaining a present running position from a starting position of an automobile comprising:*

*means for generating, during running, wheel rotation signals by detecting rotation of left and right wheels of the automobile;*

*means for calculating and storing an automobile running distance by using said wheel rotation signals;*

*means for calculating and storing an automobile turning angle by a subtraction between said left and right wheel rotation signals;*

*means for generating a signal, at the starting position, to represent a running direction of the automobile by detecting terrestrial magnetism; and*

*means for calculating and storing values of a vector from the starting position to the present running position using said calculated automobile running distance, said calculated automobile turning angle and said running direction of the automobile detected by terrestrial magnetism at the starting position.*

* * * * *